March 29, 1938. C. K. GREENE Re. 20,679

VARIABLE PITCH PROPELLER

Original Filed March 14, 1932 3 Sheets-Sheet 1

Inventor

Clarence Kirk Greene by George J. Henry

Attys

March 29, 1938. C. K. GREENE Re. 20,679

VARIABLE PITCH PROPELLER

Original Filed March 14, 1932 3 Sheets-Sheet 2

Inventor
Clarence Kirk Greene
by George J. Henry
Attys

March 29, 1938. C. K. GREENE Re. 20,679

VARIABLE PITCH PROPELLER

Original Filed March 14, 1932 3 Sheets-Sheet 3

Inventor

Clarence Kirk Greene by George J. Harry

Attys

Reissued Mar. 29, 1938

Re. 20,679

UNITED STATES PATENT OFFICE 20,679

VARIABLE PITCH PROPELLER

Clarence Kirk Greene, Los Angeles, Calif.

Original No. 1,958,336, dated May 8, 1934, Serial No. 598,806, March 14, 1932. Application for reissue March 18, 1935, Serial No. 11,592

11 Claims. (Cl. 170—163)

This invention relates to variable pitch propellers of the general character embodied in my U. S. Patent No. 1,782,167, issued November 18, 1930 and having means by which the propeller blades can be adjusted to vary the thrust exerted thereby when the propeller is in operation to the end of enabling maximum efficiency to be obtained from the propeller under all operating conditions.

It is the purpose of the present invention to provide a variable pitch propeller wherein the blade adjusting mechanism is characterized by its structural simplicity, compactness and ease of operation to smoothly vary the pitch of the blades while the propeller is in operation and in response to actuation of simple and easily operable control means.

Another object is in a variable pitch propeller means for changing the said pitch at the wish of the operator and while the said propeller is operating at full speed and load and which is accomplished quickly, safely and accurately.

Still another object is in mechanism as described pitch changing means which is proof against any accidental locking or jamming of parts and with which the operator is restricted to but one possible movement which compels an increasing pitch and a different single movement for decreasing the pitch thus insuring safety and simplicity. Other objects will appear from the specification which follows.

Only one form of the invention will be described, following which the novel features will be pointed out in claims.

In the accompanying drawings.

Figure 1:
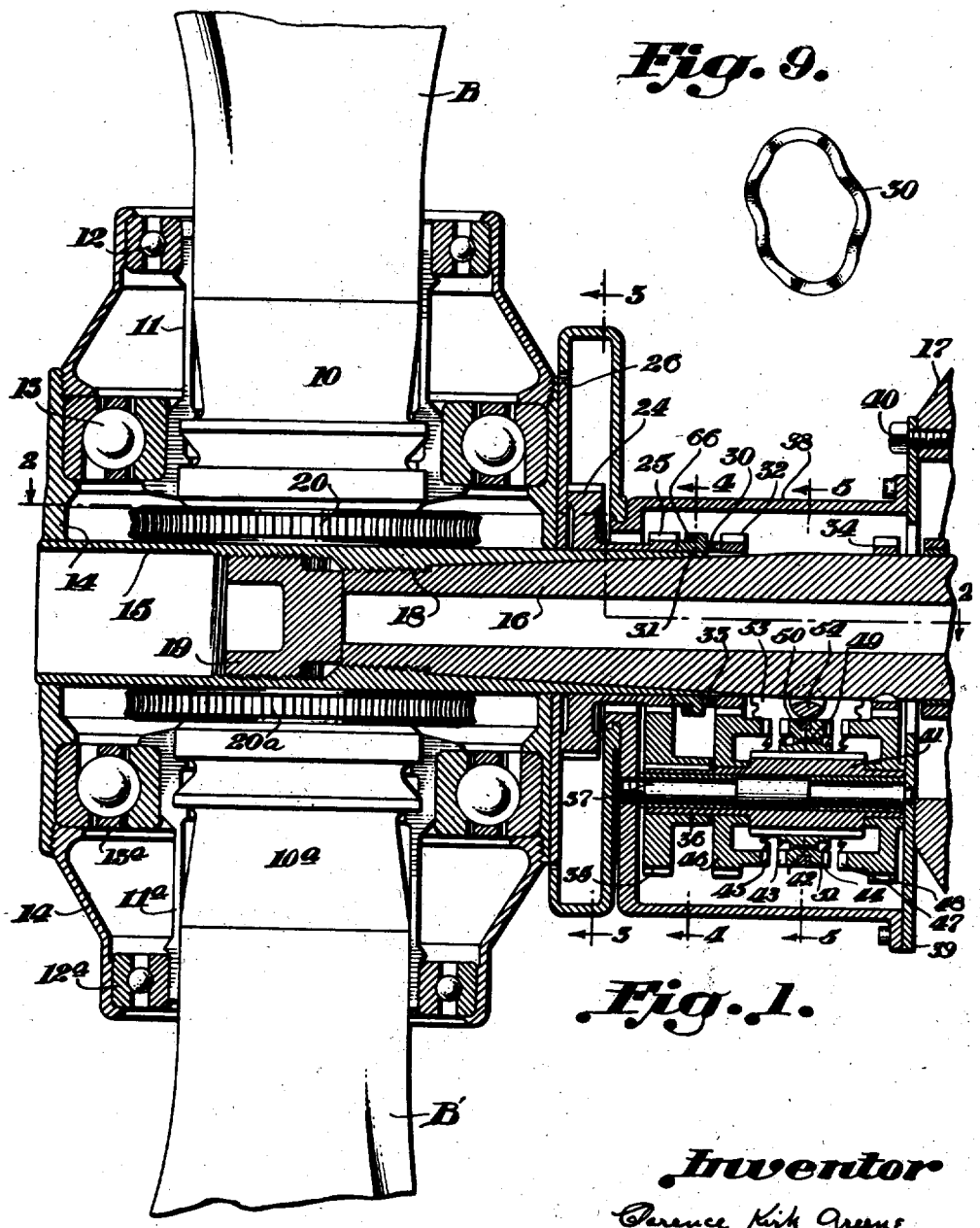
Figure 1 is a vertical central sectional view of one form of variable pitch propeller embodying this invention.
Figure 3:
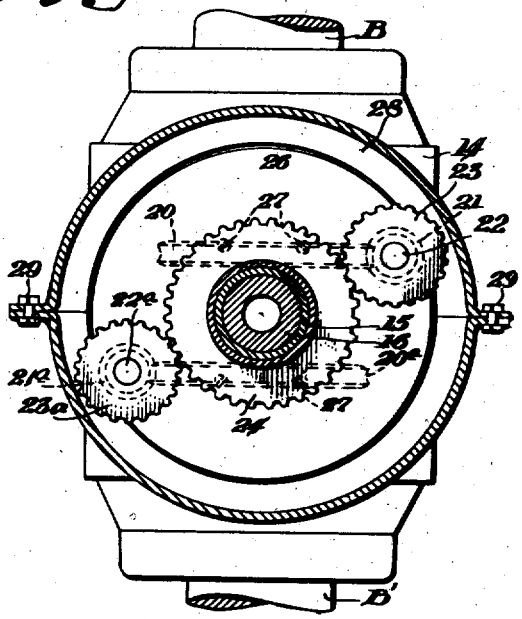
Figure 4:
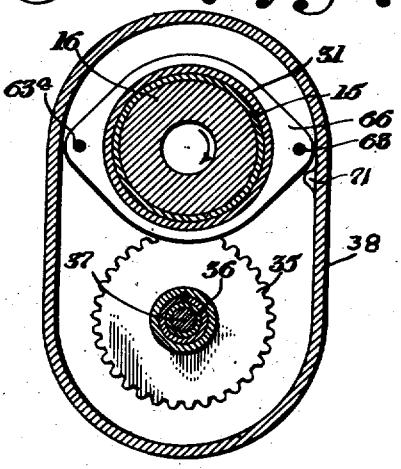
Figure 5:
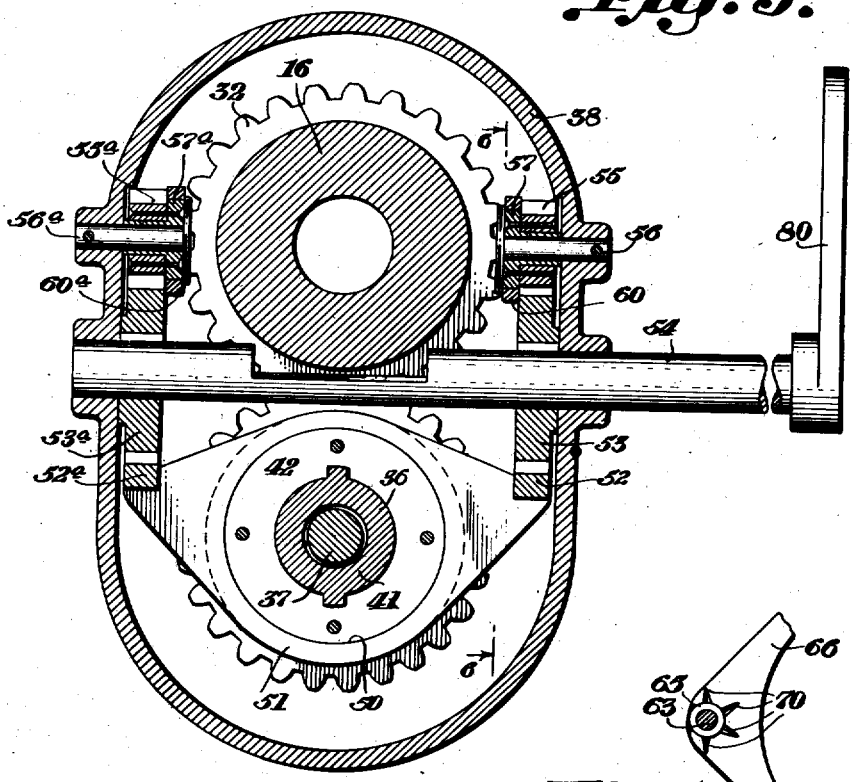
Figure 7:
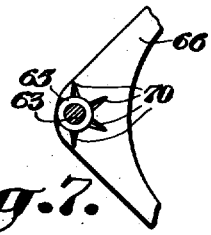
Figure 6:
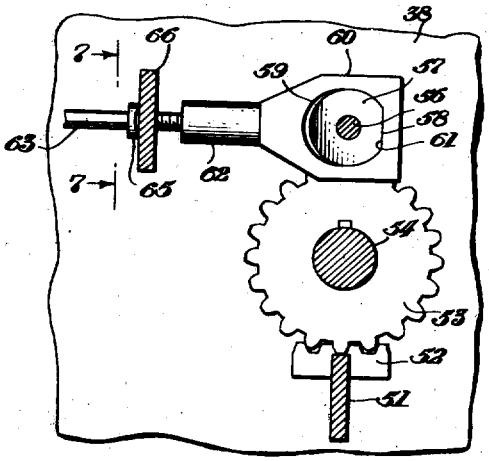
Figure 8:
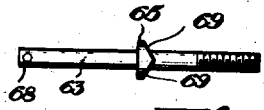

Figures 3, 4, and 5 are transverse sectional views taken, respectively on the lines 3—3, 4—4 and 5—5 of Figure 1 and looking in the directions of the respective arrows;

Figure 6 is a fragmentary sectional view taken on the line 6—6 of Figure 5 and looking in the direction of the arrows;

Figure 7 is a fragmentary sectional view taken on the line 7—7 of Figure 6 and looking in the direction of the arrows;

Figure 8 is a view in side elevation of one of two adjusting pins;

Figure 9 is a perspective view of an annular spring.

Referring specifically to the drawings, wherein similar characters designate similar parts in each of the several views, this invention is shown associated with a two-bladed propeller, the blades B and B′ of which terminate at their inner ends in stub shafts 10 and 10a mounted in split sleeves 11 and 11a journaled in suitable radial and thrust bearings 12—12a and 13—13a supported in a hub 14. Extending diametrically through the hub and fixed thereto is an internally tapered sleeve 15 receiving the tapered end of the crankshaft 16 projecting forwardly from the body 17 of a conventional form of power plant such as is employed on heavier-than-air craft. The forward end of the crankshaft has threaded engagement with the sleeve 15 at 18 and is locked to the sleeve by means of a nut 19 threaded into the latter and abutting the forward extremity of the crankshaft.

Fixed in any suitable manner to the inner ends of the stub shafts 10 and 10a are worm wheels 20 and 20a with which constantly mesh worms 21 and 21a, respectively, fixed to shafts 22 and 22a journaled in the hub 14 at diametrically opposed points, as shown in Figure 3. Relatively small gears 23 and 23a are fixed respectively to the shafts 22 and 22a exteriorly of the hub, and constantly mesh with a relatively large gear 24 formed integral with a smaller gear 25 and freely mounted on the sleeve 15 for rotation about the axis of the crankshaft 16.

Figure 2:
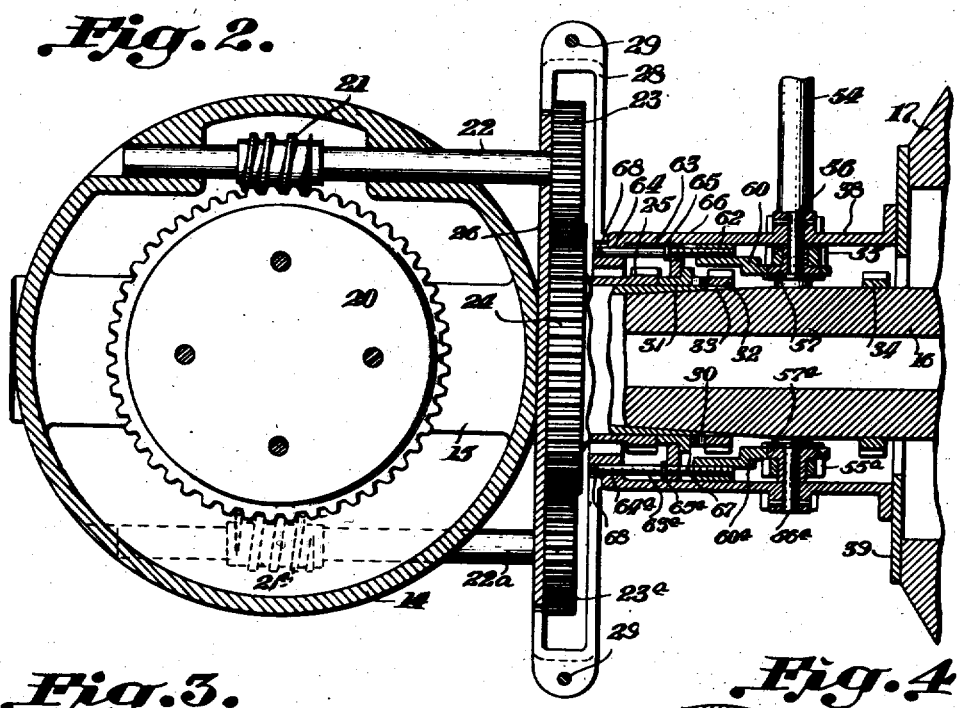
Figure 2 is a horizontal sectional view taken on the line 2—2 of Figure 1 and looking in the direction of the arrows.

A metal friction disk 26 through which the sleeve 15 and the crankshaft extend, is fixed by screws 27 (Figure 3) to the hub 14; and a circular casing 28 formed in two semi-circular sections clamped together by bolts 29, co-acts with the disk to enclose the gears 23, 23a, and 24 as shown in Figures 1, 2, and 3. The outer side face of the gear 24 is normally urged by a spring 30 into frictional engagement with the disk 26 so that during rotation of the crankshaft the gear 24 and hence the gear 25 will normally rotate with the crankshaft, to the end that the pitch of the blades will remain constant and the blades be locked by the irreversible worm and wheel connections above described.

The spring 30 is in the form of a ring corrugated circumferentially as shown in Figure 9 and interposed between a ring 31 and a driving gear 32 the ring being rotatable and slidable axially on the sleeve 15 so as to abut the gear 25 under the action of the spring, and the gear 32 being fixed to the sleeve so as to positively rotate with the crankshaft. In the present instance, the gear 32 is fixed to the sleeve 15 by slotting the rear end of the latter longitudinally at spaced intervals circumferentially, as indicated at 33, and utilizing the internal and external tapers on the sleeve and crankshaft, respectively, to expand the sleeve in the gear as the sleeve is threaded onto the crankshaft. In the present design, the gear 32 is provided with forty-eight teeth; and a second driving gear 34 is fixed to the crankshaft rearwardly of the gear 32 to also positively rotate with the crankshaft is provided with forty-seven teeth of the same pitch as the gear 32.

Constantly meshing with the gear 25 at a one-to-one ratio is a gear 35 fixed to a hollow countershaft 36 rotatively mounted on the axle 37 supported at its ends in a housing 38 and a plate 39 closing the one open end of the housing and rigidly secured to the engine body 17 by bolts 40, all as shown in Figure 1. The closed end of the housing interengages with the two semi-circular sections of the casing 28 which latter is clamped by the bolts 29 to the housing so as to be supported by the housing, as will be understood. The housing encloses the gears 25, 32, and 34 and the countershaft and clutch mechanism to be described presently.

Splined on the enlarged portion 41 of the countershaft 36 so as to rotate with the latter and yet be shiftable axially thereof is a clutch member 42 having opposed circular series of clutch teeth 43 and 44. Upon shifting the clutch member 42 towards the left as viewed in Figure 1, its teeth 43 are adapted to have clutching engagement with clutch teeth 45 formed on an idler gear 46 rotatably mounted on the countershaft and constantly meshing with the driving gear 32. When the clutch is shifted towards the right, as viewed in Figure 1, its teeth 44 are adapted to have clutching engagement with clutch teeth 47 formed on a second idler gear 48 also rotatably mounted on the countershaft and constantly meshing with the second driving gear 34. It will be remembered that the driving gears 32 and 34 are, respectively, provided with forty-eight and forty-seven teeth and it is to be noted that the idler gears 46 and 48 are provided, respectively, with forty-seven and forty-eight teeth, from which it will be understood that when the crankshaft 16 is rotating the idler gear 46 will be driven at a slightly higher speed than the crankshaft, whereas the idler gear 48 will be driven at a slightly lower speed than the crankshaft.

The clutch member 42 is constructed in two sections rigidly secured together by rivets 49 and co-acting to define an annular groove 50 freely receiving a clutch collar 51 having relatively short racks 52 and 52a at opposite sides of the countershaft axis and constantly meshing, respectively, with gears 53 and 53a fixed to a control shaft 54 journaled in the housing 38 for rocking movement by an operator to shift the clutch member 42 into clutching engagement with the clutch teeth of the idler gear 46 or 48, according as the control shaft is rocked in one direction or the other from the neutral position shown in Figure 1.

The operation of the clutch members is effected by the operator as by the lever 80 which is mounted on shaft 54 and which lever if thrown to rock the shaft 54 in one direction effects the necessary clutch movement and through the mechanism described will set up an increasing pitch of the propeller blades while a movement of the lever 80 in the opposite direction will set up a decreasing pitch of said blades.

It is to be noted that it is impossible with the clutch means described to engage both clutch members at one time which would result in stripping the gear teeth or otherwise wreck the operative mechanism which would result in disaster. With the mechanism shown a movement in one direction of the lever 80 and shaft 54 engages one clutch element and insures the disconnection of the other clutch element while a reverse movement of the lever 80 engages the other clutch element while insuring the disconnection of the first named clutch element. There is therefore no possibility of locking or jamming or damaging the parts and no possibility of rendering the mechanism inoperative as would be the case where independent clutch elements may be independently and selectively actuated by the operator. Safety is thus insured.

Constantly meshing, respectively, with the gears 53 and 53a are pinions 55 and 55a rotatably mounted, respectively, on alined stub axles 56 and 56a fixed in the housing 38 at diametrically opposed points relative to the axis of the crankshaft 16. Fixed, respectively, to the pinions 55 and 55a are cams 57 and 57a in the form of disks having a portion of their peripheries flattened at corresponding points as indicated at 58, to provide cam surfaces.

The cams 57 and 57a are freely received in circular openings 59 formed in plates 60 and 60a, the openings having flattened portions 61 at corresponding points for co-action with the flattened portions 58 of the respective cams. Threaded, respectively, into the sleeves 62 and 62a of the plates 60 and 60a, are pins 63 and 63a, rotatably mounted in bores 64 and 64a in the housing 38 and having flanges 65 and 65a intermediate their ends abutting a shift collar 66 through which the pins extend. The shift collar 66 is freely mounted on the ring 31 and abuts an annular flange 67 formed on the latter for co-action therewith in shifting the ring to the right as viewed in Figure 1, upon rocking the clutch control shaft 54 in either direction from the neutral position shown in Figure 1, all for the purpose of relieving the load of the spring 30 from the gear unit 24—25, and hence relieving the pressure of the gear 24 from the friction disk 26, so that the gear unit 24—25 will be free to rotate relative to the crankshaft 16.

That this operation will be effected will be clear from a consideration of Figures 2, 5 and 6, as upon rocking of the control shaft in either direction the flattened portions 58 of the cams 57 and 57a will co-act with the flattened portions 61 of the openings 59 in the plates 60 and 60a to draw the latter with the pins 63 and 63a, shift collar 66 and ring 31 as a unit to the right, as viewed in Figures 2 and 6, against the tension of the spring 30. It is to be noted that this operation is effected upon the initial rocking movement of the control shaft from neutral position and prior to clutching engagement of the teeth of the clutch member 42 with either the teeth of the idler gear 46 or those of the idler gear 48.

The outer ends of the pins 63 and 63a are provided with openings 68 for the reception of a suitable instrument (not shown) when the sections of the casing 28 are removed, in order to enable the pins to be rotated and a suitable adjustment thereof obtained to clear the shift collar 66 from the confronting face of the flange 67 on the ring 31, to the end of enabling the spring 30 to properly function in maintaining the gear 24 in frictional engagement with the friction disk 26 during normal operation of the propeller. The flanges 65 and 65a of the pins 63 and 63a are beveled on one side as indicated at 69 in Figure 8, for co-action with radial notches 70 in the shift collar 66, in preventing rotation of the pins, it being understood that the action of the spring 30 is to maintain the shift collar in engagement with the flanges. As shown in Figure 4, a lug 71 formed on the housing 38 is engaged by the shift collar 66 and acts to prevent any possible rotation of the latter when shifted by the cams 57 and 57a, it being assumed that the crank shaft is to rotate in the direction of the arrow in this figure.

The operation of the propeller is as follows: With the control shaft 54 and clutch member 42 occupying the neutral position shown in Figure 1, and the crankshaft 16 rotating to drive the propeller therewith, the gear unit 24—25 will rotate with the crankshaft due to the friction set up between the gear 24 and the friction disk 26. The countershaft 36 along with the clutch member 42 will thus be driven idly by the mating gears 25 and 35; and the idler gears 46 and 48 will also be rotated idly upon the countershaft by the driving gears 32 and 34, respectively. As there is no relative movement between the gear unit 24—25 and the crankshaft 16 under these conditions, the pitch of the blades B and B' will remain unchanged, and the blades will be locked due to the fact that the worm wheels 20 and 20a cannot drive the respective worms 21 and 21a.

When it is desired to change the pitch of the blades in one direction, the control shaft 54 is rocked for example from the neutral position shown in a direction to shift the clutch member 42 into engagement with the clutch teeth of the idler gear 46, it being remembered that upon initial movement of the clutch member, the force of the spring 30 will be relieved from the gear unit 24—25 so that the latter will be free for rotation relative to the crankshaft. As the idler gear 46 is now locked to the countershaft, and is being driven by the gear 32 at a speed slightly in excess of crankshaft speed, it will be clear that the gear 35 will co-act with the gear 25 to drive the gear unit 24—25 at a speed slightly in excess and in the same direction as the crankshaft, with the result that the gears 23 and 23a will not only revolve about the axis of the crankshaft but will also be rotated about their own axes by the gear 24, thus causing the worms 21 and 21a to drive the worm wheels 20 and 20a, respectively, and vary the pitch of the blades in one direction.

To change the pitch of the blades in the reverse direction, the control shaft 54 is reversely rocked from neutral position to shift the clutch member 42 into engagement with the clutch teeth of the idler 48. As the idler gear 48 is now locked to the countershaft and is being driven by the gear 34 at a speed slightly less than crankshaft speed, the gear 35 will co-act with gear 25 to drive the gear unit 24—25 at a speed slightly less than, and in the same direction as, the crankshaft, thus driving the gears 23, 23a, worms 21 and 21a and worm wheels 20 and 20a in directions reverse to that in which they were previously driven when the idler gear 46 was being driven by the driving gear 32, with the result that the pitch of the blades will be varied in the reverse direction.

It will thus be manifest that by the simple expedient of coupling the idler gear 46 or the idler gear 48 to the countershaft 36, these gears will be positively driven by the respective driving gear 32 or 34 to cause the gear unit 24—25 to be driven in one and the same direction as the crankshaft, but either in excess or less than crankshaft speed, depending on whether the idler gear 46 or 48 is in use, to the end of increasing or decreasing the pitch of the blades. It will be understood that when the desired adjustment of the blades has been effected, the control shaft 54 is moved to the neutral position, leaving the blades locked in the position to which they have been adjusted. Any suitable operative connection (not shown) can be provided for actuating the control shaft from a remote point convenient to the pilot of the aircraft.

What is claimed is:

1. A rotary propeller having blades mounted for adjustment to vary the pitch thereof; means including a gear mounted for rotation about the propeller axis for moving the blades to vary the pitch thereof in one direction or the other according as the gear is driven at a speed in excess of or less than propeller speed; a pair of idler gears separately mounted for independent rotation about a common axis; means for driving said idler gears respectively at speeds in excess and less than propeller speed; and means for operatively connecting one idler gear or the other to the first mentioned gear, to accordingly drive the latter at a speed in excess or less than propeller speed.

2. A rotary propeller having blades mounted for adjustment to vary the pitch thereof; means including a gear mounted for rotation about the propeller axis for moving the blades to vary the pitch thereof in one direction or the other according as the gear is driven at a speed in excess or less than propeller speed; a pair of idler gears separately mounted for independent rotation about a common axis; a pair of driving gears fixed to rotate with the propeller and meshing with the idler gears to drive one of the latter at a speed in excess of propeller speed and the other at a speed less than propeller speed; and means for operatively connecting one idler gear or the other to the first mentioned gear to accordingly drive the latter at a speed in excess or less than propeller speed.

3. A rotary propeller having blades mounted for adjustment to vary the pitch thereof; means including a gear mounted for rotation about the propeller axis, for moving the blades to vary the pitch thereof in one direction or the other according as the gear is driven at a speed in excess of or less than propeller speed; a pair of idler gears separately mounted for independent rotation about a common axis; means for driving said idler gears respectively at speeds in excess of and less than propeller speed; and means including a clutch for operatively connecting one idler gear or the other to the first mentioned gear, to accordingly drive the latter at a speed in excess of or less than propeller speed.

4. A rotary propeller having blades mounted for adjustment to vary the pitch thereof; means including a gear mounted for rotation about the propeller axis, for moving the blades to vary the pitch thereof in one direction or the other according as the gear is driven at a speed in excess or less than propeller speed; a pair of idler gears mounted for rotation about a common axis; means for driving one idler gear at a speed in excess of propeller speed and the other idler gear at a speed less than propeller speed; means including a clutch member for operatively connecting one idler gear or the other to the first mentioned gear, to accordingly drive the latter at a speed in excess or less than propeller speed; a clutch collar for shifting the clutch member, having racks thereon; an oscillatory control shaft; and gears fixed to the control shaft and meshing with the racks for co-action with the clutch collar in shifting the clutch collar in one direction or the other in response to oscillation of the control shaft.

5. A rotary propeller having blades mounted for adjustment to vary the pitch thereof; means including a gear mounted for rotation about the propeller axis for moving the blades to vary the pitch thereof in one direction or the other according as the gear is driven at a speed in excess or less than propeller speed; a countershaft; a gear fixed to the countershaft and operatively to the first mentioned gear to drive the latter; two idler gears rotatably mounted on the countershaft; two driving gears fixed for rotation with the propeller about the axis of the latter; the driving gears meshing, respectively, with the idler gears to drive one of the latter at a speed in excess of propeller speed and the other idler gear at a speed less than propeller speed; a clutch member splined on the countershaft; and means for shifting the clutch member into clutching engagement with one idler gear or the other to either drive the first mentioned gear at a speed in excess or less than propeller speed.

6. A rotary propeller having blades mounted for adjustment to vary the pitch thereof; means including a gear mounted for rotation about the propeller axis, for moving the blades to vary the pitch thereof in one direction or the other according as the gear is driven at a speed in excess or less than propeller speed; a countershaft; a gear fixed to the countershaft and operatively to the first mentioned gear to drive the latter; two idler gears rotatably mounted on the countershaft; two driving gears fixed for rotation with the propeller about the axis of the latter; the driving gears meshing, respectively, with the idler gears to drive one of the latter at a speed in excess of propeller speed and the other idler gear at a speed less than propeller speed; a clutch member splined on the counter shaft; a clutch collar rotatably receiving the clutch member and having racks thereon; an oscillatory control shaft; and gears fixed to the control shaft and meshing with the racks for coaction therewith in shifting the clutch member into clutch engagement with one idler gear or the other to either drive the first mentioned gear at a speed in excess or less than propeller speed.

7. A rotary propeller having blades mounted for adjustment to vary the pitch thereof; means including a gear mounted for rotation about the propeller axis, for moving the blades to vary the pitch thereof in one direction or the other according as the gear is driven at a speed in excess or less than propeller speed; a friction member rotatable with the propeller; means for urging said gear into engagement with the friction member to cause the gear to be driven by friction with the propeller; two means, one for driving said gear at a speed in excess of propeller speed and the other for driving said gear at a speed less than propeller speed; means for selectively rendering one or the other of said two means active to drive said gear; and means for rendering the urging means ineffective when either of said two means is active so that said gear will be free to be driven at a speed relative to propeller speed.

8. A rotary propeller having blades mounted for adjustment to vary the pitch thereof; means including a gear mounted for rotation about the propeller axis, for moving the blades to vary the pitch thereof in one direction or the other according as the gear is driven at a speed in excess of or less than propeller speed; a friction member rotatable with the propeller; spring means for urging said gear into engagement with the friction member to cause the gear to be frictionally driven with the propeller at propeller speed; means for selectively driving said gear at a speed in excess of or less than propeller speed; and means for relieving said gear of the urging action of said spring means when the last means is active, so that said gear will be free to be driven at a speed relative to propeller speed.

9. A rotary propeller having blades mounted for adjustment to vary the pitch thereof; means including a rotatable member for moving the blades to vary their pitch in one direction or the other according as the rotatable member is driven at a speed in excess of or less than propeller speed; two idler members mounted for rotation about a common axis; means responsive to the rotation of the propeller to drive one of said idler members at a speed in excess of propeller speed and the other idler member at a speed less than propeller speed; and means for operatively connecting one idler member or the other to the rotatable member, to accordingly drive the latter at a speed in excess of or less than propeller speed.

10. A rotary propeller having blades mounted for adjustment to vary the pitch thereof; means including a gear mounted for rotation about the propeller axis, for moving the blades to vary the pitch thereof in one direction or the other according as the gear is driven at a speed in excess of or less than propeller speed; a countershaft; a gear fixed to the countershaft and operatively to the first mentioned gear to drive the latter; two idler gears rotatably mounted on the countershaft; two driving gears fixed for rotation with the propeller about the axis of the latter; the driving gears meshing, respectively, with the idler gears to drive one of the latter at a speed in excess of propeller speed and the other idler gear at a speed less than propeller speed; a clutch member splined on the countershaft; a clutch collar rotatably receiving the clutch member and having racks thereon; an oscillatory control shaft; gears fixed to the control shaft and meshing with the racks for co-action therewith in shifting the clutch member into clutching engagement with one idler gear or the other to either drive the first mentioned gear at a speed in excess of or less than propeller speed; a friction member rotatable with the propeller; spring means for urging the first mentioned gear into engagement with the friction member; and means for removing the load of the spring means from the first mentioned gear prior to engagement of the clutch member with one idler gear or the other.

11. A rotary propeller having blades mounted for adjustment to vary the pitch thereof; means including a gear mounted for rotation about the propeller axis, for moving the blades to vary the pitch thereof in one direction or the other according as the gear is driven at a speed in excess of or less than propeller speed; a countershaft; a gear fixed to the countershaft and operatively to the first mentioned gear to drive the latter; two idler gears rotatably mounted on the countershaft; two driving gears fixed for rotation with the propeller about the axis of the latter; the driving gears meshing, respectively, with the idler gears to drive one of the latter at a speed in excess of propeller speed and the other idler gear at a speed less than propeller speed; a clutch member splined on the countershaft; a clutch collar rotatably receiving the clutch member and having racks thereon; an oscillatory control shaft, gears fixed to the control shaft and meshing with the racks for co-action therewith in shifting the clutch member into clutching engagement with one idler gear or the other to either drive the first mentioned gear at a speed in excess of or less than propeller speed; a friction member rotatable with the propeller; spring means for urging the first mentioned gear into engagement with the friction member; pinions meshing with the control shaft gears; cams rotatable with the pinions; and means including a shift collar operable by the cams upon rotation of the pinions in one direction or the other, to remove the load of the spring means from the first mentioned gear prior to the engagement of the clutch member with one idler gear or the other.

CLARENCE KIRK GREENE.